UNITED STATES PATENT OFFICE.

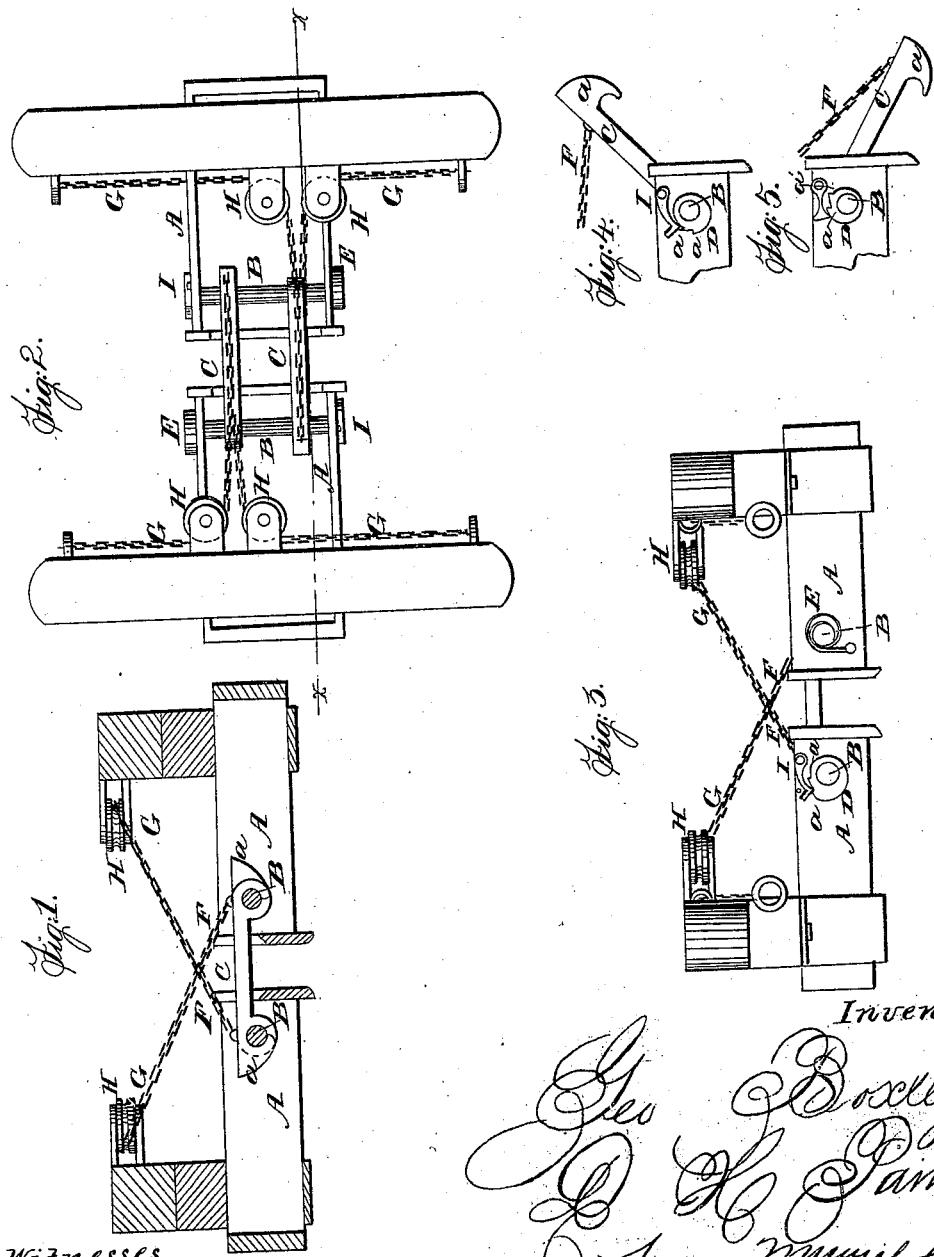

D. H. PAYNE AND GEO. BOXLEY, OF TROY, NEW YORK.

IMPROVED CAR-COUPLING.

Specification forming part of Letters Patent No. 53,037, dated March 6, 1866.

*To all whom it may concern:*

Be it known that we, D. H. PAYNE and GEORGE BOXLEY, of Troy, in the county of Rensselaer and State of New York, have invented a new and Improved Car-Coupling; and we do hereby declare that the following is a full, clear, and exact description thereof, which will enable others skilled in the art to make and use the same, reference being had to the accompanying drawings, forming part of this specification, in which—

Figure 1 is a longitudinal vertical section of our invention, taken in the line $x\ x$, Fig. 2. Fig. 2 is a plan or top view of the same; Fig. 3, a side view of the same; Figs. 4 and 5, detached side views of the end of a draw-head, showing different portions of the shackle.

Similar letters of reference indicate like parts.

This invention relates to a new and improved car-coupling of that class whch connect themselves as the cars come in contact, and which are commonly termed "self-acting" or "self-coupling."

The invention consists in the employment or use of shackles provided with hooks at their outer ends and fitted on shafts which have a coil-spring connected at one end and a ratchet at the opposite end, into which a pawl catches, the shackles having chains attached passing around guide-pulleys on the end of the platforms, and all arranged substantially as hereinafter set forth, whereby the cars, as they come in contact, will be connected with certainty, a difference in the height of the platforms of the cars, if any there be, readily compensated for, and the coupling readily disconnected whenever necessary without the necessity of a person passing between the cars to effect that end.

A A represent the two draw-heads of two adjoining cars. These draw-heads may be attached to the under sides of the platforms and beds of the cars in the usual or in any proper manner.

Each draw-head has a shaft, B, placed transversely in its front part, and on these shafts the shackles C are firmly keyed, the shafts being allowed to turn freely in the draw-heads. On one end of these shafts there are fitted ratchets D, having each two teeth, $a\ a'$, as shown in Figs. 3, 4, and 5, and to the opposite ends there are connected coil-springs E, which have a tendency to keep the outer ends of the shackles depressed. Each shackle has a chain, F, attached to it, and these chains branch out into two parts, G G, which pass around pulleys H H attached to the ends of the platforms, the chains G extending one to each side of the same, as shown clearly in Fig. 2.

The draw-heads are disconnected by pulling the chains G, and thereby raising the shackles C, the outer ends of which are made in the form of hooks $a$, which catch over the shaft B, the shackle of one draw-head catching over the shaft of the adjoining draw-head, and vice versa. The shackles are raised until pawls I catch into the teeth $a'$ of the ratchets D, the ratchets and pawls holding the shackles above the shafts. (See Fig. 4, in which this raised or upward position of one of the shackles is shown.)

In order to set the shackles in proper position for coupling, the pawls I are allowed to catch into the teeth $a$ of the ratchets D, which will hold the shackles about in a horizontal position. If, however, the draw-head of one car be rather higher than that of the other, the shackle of the highest draw-head is allowed to ascend to its fullest extent, as shown in Fig. 5, the ratchet being free from the pawl entirely.

The front ends of the draw-heads are provided with plates beveled at their upper edge for the outer rounded surfaces of the hooks $a$ to strike against and be thrown and deflected upward, so as to catch over the shafts B B.

When it is not designed to have the cars connected the shackles are raised to the position shown in Fig. 4—the position in which they are placed in disconnecting the draw-heads.

Having thus described our invention, we claim as new and desire to secure by Letters Patent—

The shackles C C, connected to the shafts B B, in combination with the springs E, ratchets D, and pawls I, all arranged in connection with the chains or their equivalents and draw-heads, substantially as and for the purpose herein set forth.

The above specification of our invention signed by us this 13th day of November, 1865.

D. H. PAYNE.
GEO. BOXLEY.

Witnesses:
M. M. LIVINGSTON,
C. L. TOPLIFF.